United States Patent
Braedt (10) Patent No.: US 9,260,158 B2
(45) Date of Patent: Feb. 16, 2016

(54) MULTI-GEAR CASSETTE FOR A BICYCLE

(75) Inventor: Henrik Braedt, Gerbrunn (DE)

(73) Assignee: SRAM, LLC, Chicago, IL (US)

( * ) Notice: Subject to any disclaimer, the term of this patent is extended or adjusted under 35 U.S.C. 154(b) by 499 days.

(21) Appl. No.: 13/307,331

(22) Filed: Nov. 30, 2011

(65) Prior Publication Data

US 2012/0302384 A1 Nov. 29, 2012

(30) Foreign Application Priority Data

Dec. 7, 2010 (DE) .......................... 10 2010 053 597

(51) Int. Cl.
*F16H 55/30* (2006.01)
*B62M 9/10* (2006.01)

(52) U.S. Cl.
CPC ....................................... *B62M 9/10* (2013.01)

(58) Field of Classification Search
USPC .................................................. 474/160, 164
See application file for complete search history.

(56) References Cited

U.S. PATENT DOCUMENTS

| | | | |
|---|---|---|---|
| 4,044,621 A | 8/1977 | McGregor et al. | |
| 4,380,445 A * | 4/1983 | Shimano | 474/144 |
| 2006/0058140 A1* | 3/2006 | Nakano et al. | 474/152 |
| 2008/0004143 A1* | 1/2008 | Kanehisa et al. | 474/160 |
| 2008/0234082 A1* | 9/2008 | Braedt | 474/116 |
| 2009/0215565 A1* | 8/2009 | Braedt | 474/160 |
| 2009/0215566 A1* | 8/2009 | Braedt | 474/160 |
| 2010/0004081 A1* | 1/2010 | Braedt | 474/160 |
| 2010/0075791 A1* | 3/2010 | Braedt | 474/160 |
| 2011/0105263 A1* | 5/2011 | Braedt | 474/160 |
| 2012/0244976 A1* | 9/2012 | Lin | 474/160 |
| 2012/0302384 A1* | 11/2012 | Braedt | 474/160 |

FOREIGN PATENT DOCUMENTS

DE 202004019270 6/2005

\* cited by examiner

*Primary Examiner* — William E Dondero
*Assistant Examiner* — Mark K Buse
(74) *Attorney, Agent, or Firm* — Milan Milosevic; Lisa Serdynski (57) ABSTRACT

The invention relates to a multi-sprocket cassette mountable to a bicycle rear wheel for engaging a drive chain. The cassette includes a conical body formed as a single piece having a center axis that includes a plurality of sprocket portions, each of the plurality of sprocket portions including a plurality of teeth formed thereabout for engaging the drive chain and a plurality of connecting portions supporting each of the plurality of sprocket portions. One or more of the plurality of connecting portions includes a first wall thickness and one or more of the plurality of connecting portions includes a second wall thickness. The second wall thickness is less than the first wall thickness. A plurality of openings is formed through each of the plurality of connecting portions having the first wall thickness.

19 Claims, 8 Drawing Sheets

MULTI-GEAR CASSETTE FOR A BICYCLE

BACKGROUND OF THE INVENTION

The invention relates to a multi-gear cassette with different sized sprockets for engaging a chain and for transferring a longitudinal force from the chain to a hub of a rear wheel of a bicycle with the possibility of transferring the chain from one sprocket to another by using a shifting device, whereby a ring-shaped element is arranged in a transition area between one sprocket and a next larger sprocket.

With multi-gear cassettes of the usual type, a cassette consisting of a number of sprockets with different diameters is mounted on a driver of a hub. When a shifting device is actuated, teeth of each sprocket come into engagement alternately with the chain and transfer torque from the rider's pedal forces to the driver by way of a profile that connects the sprockets to the driver so they rotate together. Thus, each of these sprockets individually transfers the torque to the driver, whereby both the carrier profile as well as the sprocket must be designed so they are sufficiently strong to resist lateral forces from the chain and thus heavy.

To fulfill different requirements, for example for ever-lighter construction in bicycle racing, or as a result of increased demands for precision in connection with a further increase in the number of gears, the solution of a single-unit construction of multiple sprocket devices has been implemented.

Thus, a multi-sprocket device has become known from US 2008/0230344, in which several sprockets are formed on a conical support structure, in which cylindrical and disk portions alternate in a step shape and in which each single sprocket portion is formed by a disk portion and has teeth arranged on its periphery for engagement with a chain. The support structure can be designed with very small wall thickness, which is limited toward the minimum mainly by the manufacturing tolerances. The stability is greater due to the alternate cylindrical and disk portions in succession than with a continuously conical support structure with the same small wall thickness.

In DE 10 2008 010 904, a solution is selected in which openings are worked into the step-shaped and overall conical support structure at the places where only low loads are to be transferred, starting from an engagement force on a tooth to adjacent portions of the support structure. A webbed structure with webs results, starting from a tooth of a smaller sprocket to the adjacent sprocket portion, which in turn consists of a disk portion and the teeth. The largest sprocket in the form of an end sprocket that passes on the torque for transmission to the hub sleeve and the conical sprocket hollow element are installed to form a unit, which is supported directly or indirectly with respect to the hub axle so it can rotate.

SUMMARY OF THE INVENTION

It has now been found that under certain conditions, support structures between adjacent sprocket portions without openings but with minimal wall thickness of the support structure, represent the optimal solution with regard to low weight and good manufacturing feasibility. Under other conditions, support structures with openings are the optimal solution, whereby webs are present between the single sprocket portions and result in a webbed structure. The conditions addressed include the differences in tooth count with respect to the adjacent sprockets, the tooth count of the sprockets and the axial position in which the sprocket portion involved is located in the multi-sprocket arrangement.

In the multi-sprocket arrangement according to the invention, both support structures with minimum possible wall thickness and without openings, as well as support structures with definitely larger wall thickness and with openings, are combined with each other. Designs in which the larger wall thickness is about twice as large as the smaller wall thickness represent an especially advantageous embodiment that combines extremely low weight with adequate strength and stability.

An embodiment of multi-sprocket devices according to the invention will be described in the following with the use of figures.

DETAILED DESCRIPTION OF A PREFERRED EMBODIMENT

Figure 1:
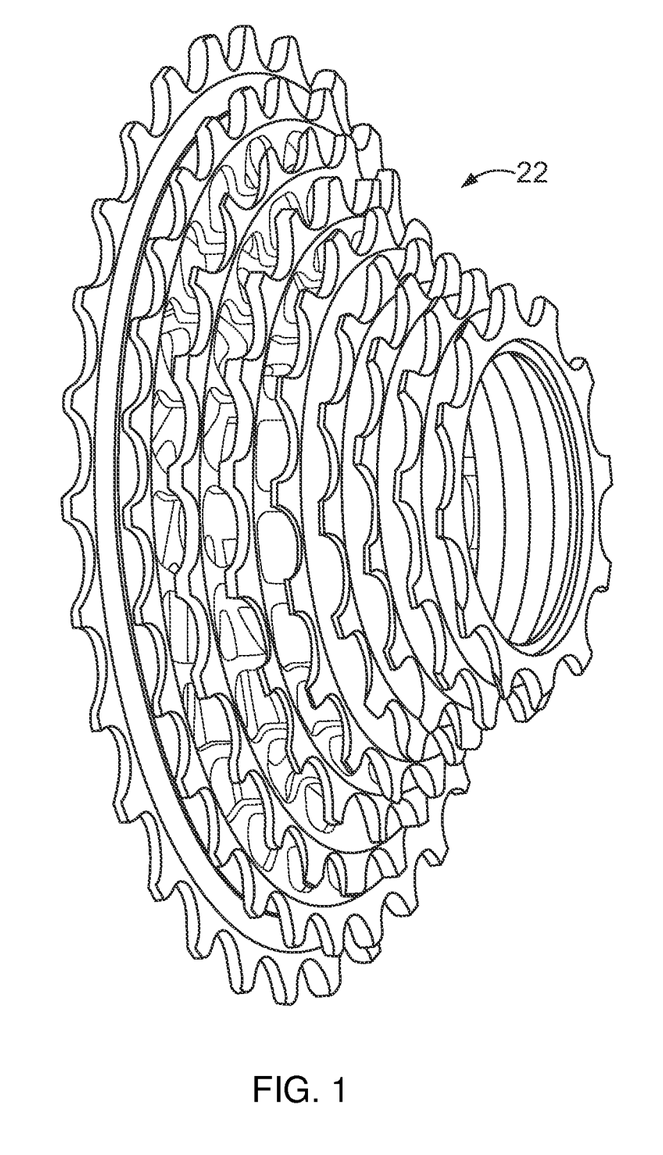
FIG. 1 is an overall perspective view of a preferred embodiment of a multi-sprocket cassette according to the invention with a conical body and an end sprocket attached to the conical body.
Figure 2:
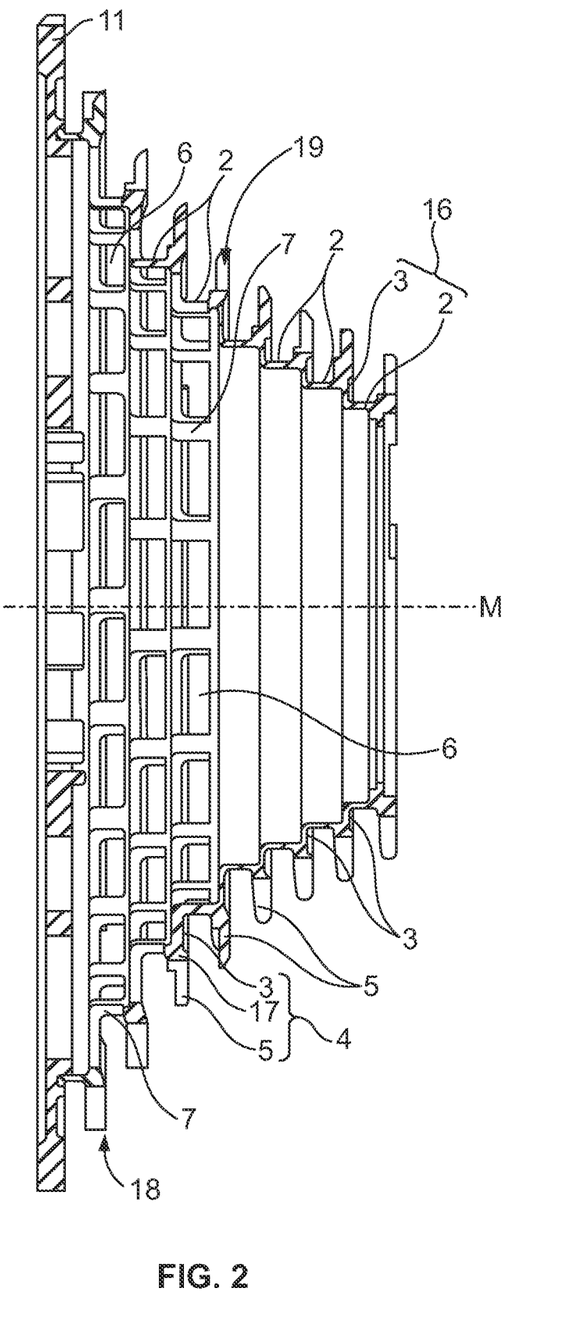
FIG. 2 is a side cross-sectional view taken parallel to the center axis M through the conical body of the multi-sprocket cassette according to the invention of FIG. 1, part of which is provided with a first wall thickness and with several adjacent openings resulting in a webbed structure and a different part of which is provided with a second, smaller wall thickness and without openings.

Turning to FIGS. 1 and 2, a bicycle multi-gear or multi-sprocket cassette 22 has a generally conical body or bearing structure 1 with an overall frustoconical shape that is formed of a succession of connecting portions 16 and on which teeth portions 5 are formed and arranged at various axial positions. The geometric axis of the body 1 also corresponds to the axis of its rotary movement during use. Each connecting portion 16 represents a connection between the teeth 5 with different axial positions and each includes a cylindrical portion 2 and an immediately adjacent disk portion 3. The resulting cross section of the series of connecting portions 16 can be seen in FIG. 2, which may be step-shaped in configuration, The sprocket portion 4 can be generally thought of as the part of the conical body 1 including the teeth 5 formed thereon and, optionally including tooth base ring 17. The tooth base ring 17 may have an extension essentially in the same axial direction as the teeth 5.

Figure 4:
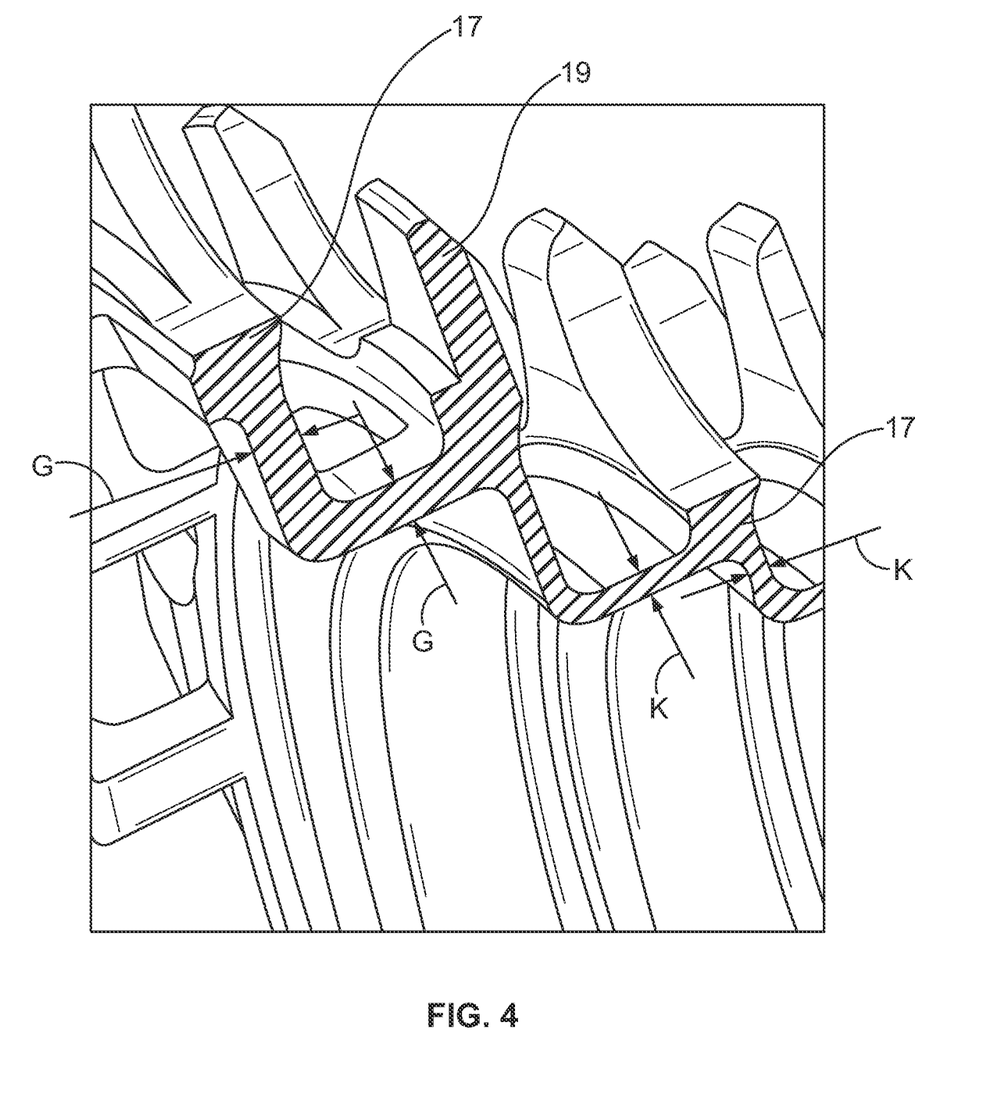
FIG. 4 is a partial cutaway view of the, portions of the conical body in which a web to the adjacent larger sprocket section is formed.

As can be seen in FIGS. 2 and 4, the part or portions of the conical body 1 including openings 6 may include a relatively large wall thickness G, which will be referred to a first thickness, while the part or portions of the conical body 1 without openings 6 may include a relatively smaller wall thickness K, which will be referred to a second thickness. The first wall thickness may be from about 0.08 mm to about 1.2 mm. The second wall thickness may be from about 0.4 mm to about 0.6 mm. Since in the exemplary embodiment shown in FIG. 2, the openings 6 are each formed through the cylindrical portion 2 and the disk portion 3 at the same circumferential position, webs 7 result that originate at the, positions of teeth 5 on the respectively smaller sprocket portion 4 and essentially run at the same circumferential position with respect to the adjacent larger sprocket portion 4. Because of this, a webbed structure is formed. With regard to low weight and adequate load bearing capability, it has been found that especially favorable ratios result if the wall thickness G is twice as large as the small wall thickness K.

Figure 3:
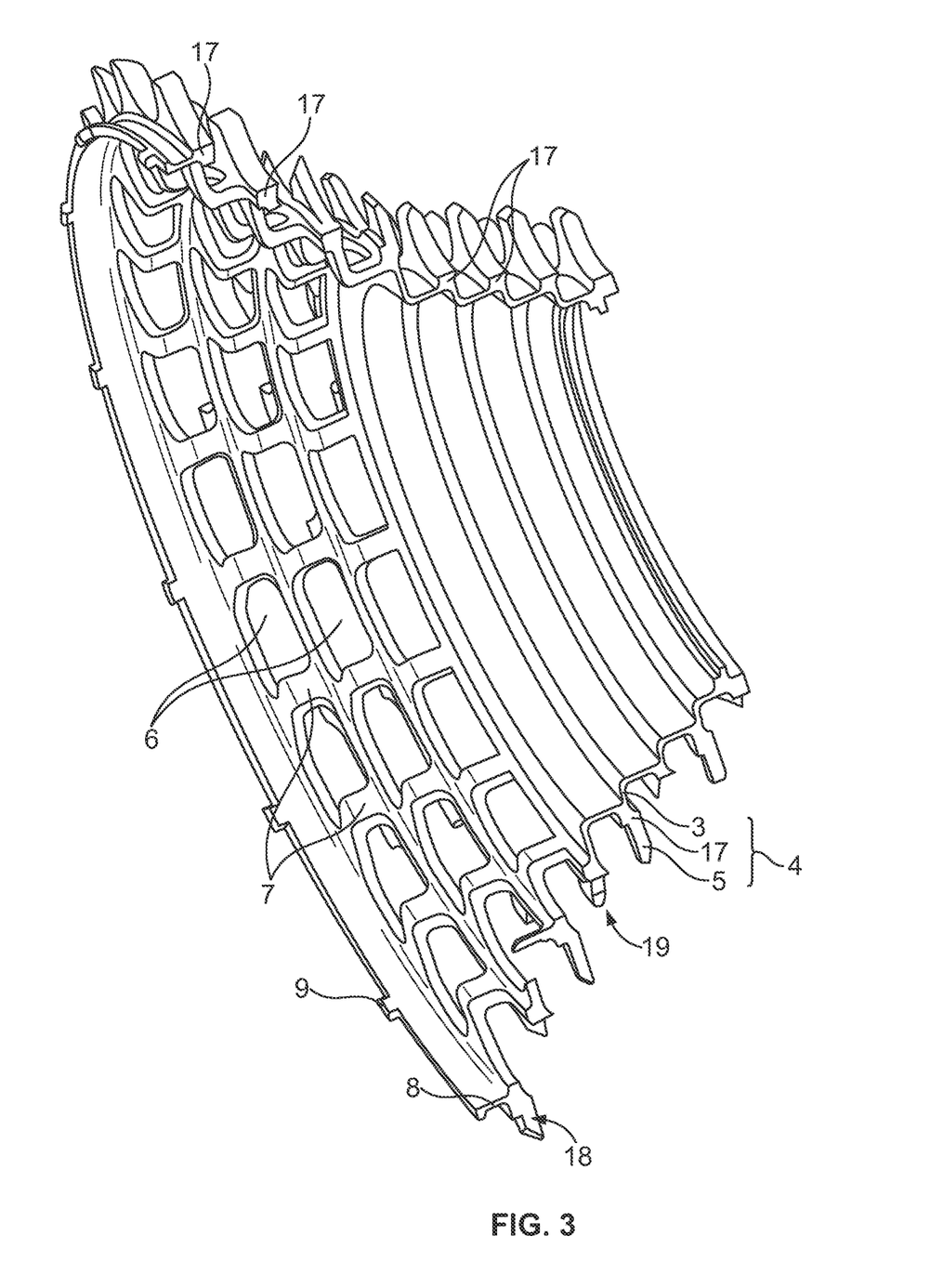
FIG. 3 is an interior perspective view of the conical body according to FIG. 2.
Figure 9:
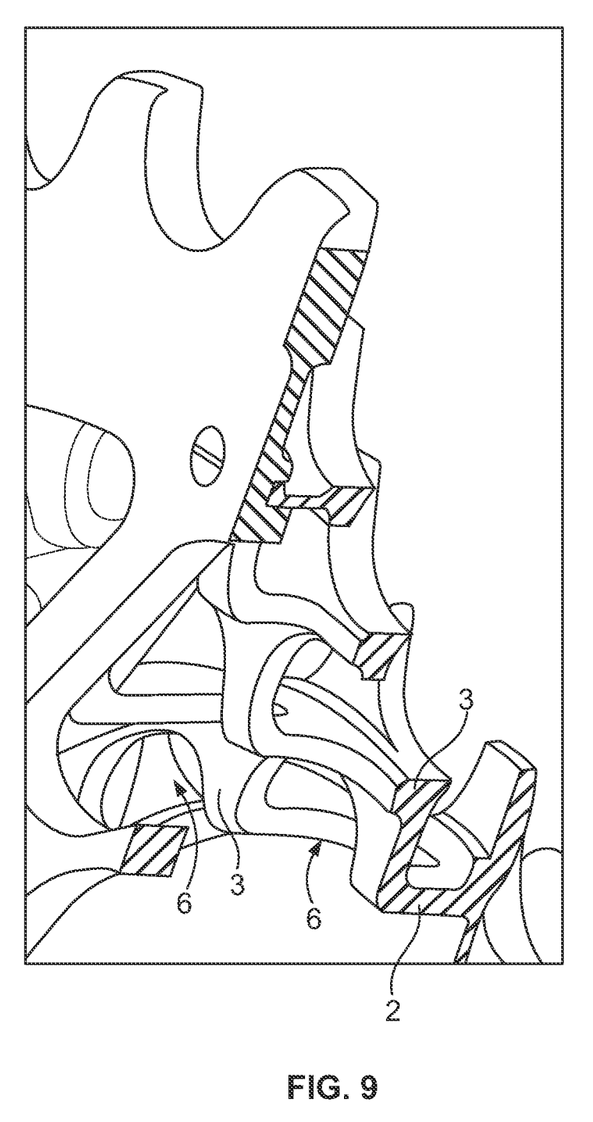
FIG. 9 is a partial cutaway view of openings in the body.

The resulting weight savings increases with the size of the openings and also increases when openings are formed both through the cylindrical portion 2 and in the disk portion 3 and thus webs 7 are formed, as can be seen clearly in FIG. 3. However, also in embodiments in which only the cylindrical portion 2 or the disk portion 3 has openings, the goal of a lower weight is fulfilled. The weight saving that can be achieved with the concept of a relatively large wall thickness in combination with openings is especially great if the difference in number of teeth is large in the involved connecting portion 16 and the next larger sprocket portion 4 has at least two teeth more that the adjacent smaller sprocket portion 4. If the difference in number of teeth is only one tooth, the weight saving that can be achieved by working in openings 6 is not as great, and a formation of a connecting portion without openings and with low wall thickness is more advantageous and can also be manufactured more easily. When openings are worked in by milling operations, an end miller may be used, which is moved radially outward. The diameter of this milling tool can be recognized from the rounding of the openings 6 in FIG. 9. If, with a difference in number of teeth of one tooth, the disk portion 3 is only very short, i.e. clearly shorter than in FIG. 9, the use of a milling tool with a larger diameter leads to a situation in which all of the material is no longer removed, which could have been removed while providing adequate strength. On the other hand, if a milling tool with a relatively small diameter is used, this milling tool must only be moved radially outward at low speed, and otherwise the stresses on the milling tool would be too great.

Although in the exemplary embodiment shown, openings are preferably formed through both the cylindrical portion 2 and also the disk portion 3, openings can also be worked in only the cylindrical portion 2, or alternatively, only the disk portion 3 in order to achieve a weight saving. In turn, the wall thickness may be selected so it is about twice as large in'portions through which openings are formed, in comparison to connecting portions 16 involved where no openings 6 are present.

A particular sprocket portion 4, of which the connecting portion 16 leading to the next smaller diameter sprocket portion has no openings and the connecting portion leading to the next larger diameter sprocket portion 4 has openings, as shown in FIG. 4, is designated as a transitional sprocket 19. Generally, a multi-sprocket cassette at first may have small sprockets with low differences in tooth count with respect to the adjacent sprockets, while in the larger sprockets larger differences in the number of teeth may exist. It has proven to be advantageous that, in a multi-sprocket cassette according to the invention, the first sprocket portion 4, which has a difference in number of teeth of more than one tooth in comparison to the next larger sprocket portion 4, is not designed as a transitional sprocket 19, but rather the sprocket portion 4, for which in the sequence of sprocket portions 4 a tooth count difference of more than one tooth compared to the next larger sprocket portion 4 occurs for the first time. With this design, an adequately good transfer of forces exists between parts of the connecting portions 16 with openings 6 to the components of the connecting portions 16 without openings.

Figure 5:
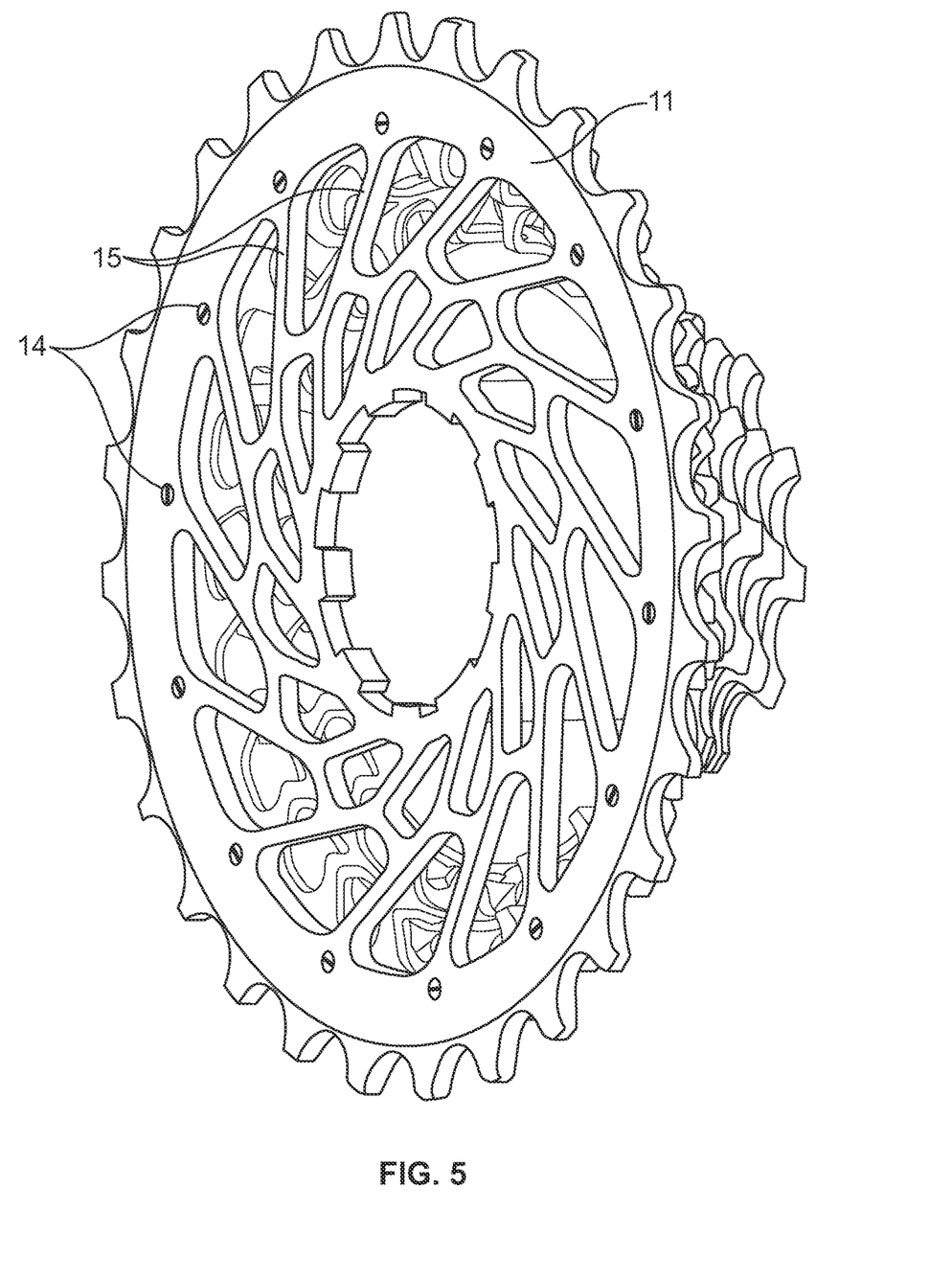
FIG. 5 is an overall rear perspective view of a multi-sprocket cassette according to the invention with an end sprocket.
Figure 7:
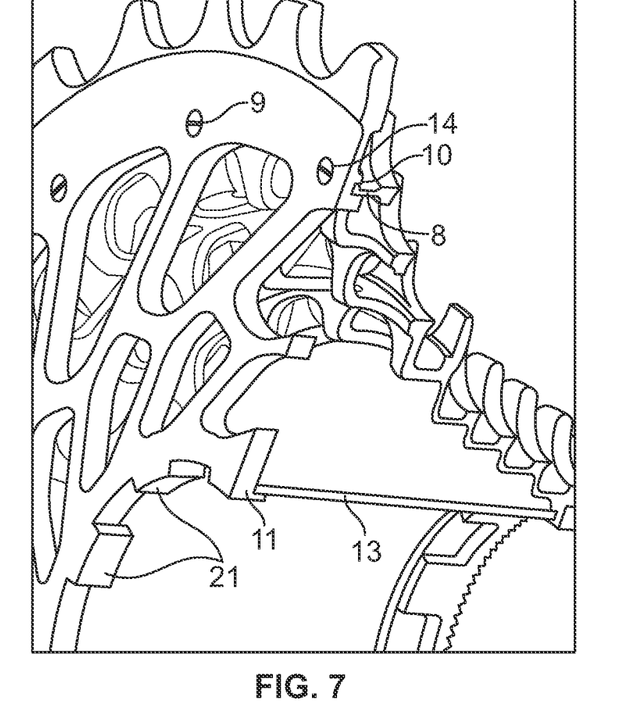
FIG. 7 is a partial detailed view of the multi-sprocket cassette according to FIG. 6.
Figure 8:
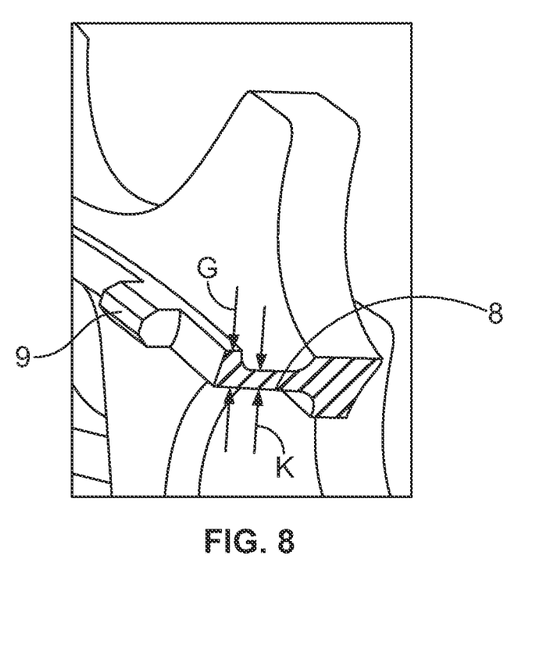
FIG. 8 is a partial cutaway view of the connecting location between the end sprocket and the conical body that has a thin-walled end sprocket mounting ring axially extending toward the end sprocket.

An end sprocket 11 is connected to the largest sprocket portion 4 axially inboard the conical body 1, as shown in FIG. 5. This end sprocket 11 may be used both to support the multi-sprocket cassette with respect to a hub (not shown), as well as to transfer the torque introduced by way of one of the teeth of a sprocket portion 4 into the conical body 1 to the driven hub. A secure and yet simple connection between conical body 1 and end sprocket 11 is provided by a ring portion or end sprocket mounting ring portion 8 projecting axially from the largest of the sprocket portions 4. The end sprocket mounting ring 8 is configured to engage an optional ring groove 10 formed in the end sprocket 11, in connection with mounting projections 9 arranged on the end sprocket mounting ring that configured to fit in the mounting holes 14 on the end sprocket 11. The end sprocket mounting ring 8 may be formed free of openings and of a second wall thickness up to its axial section, which is configured to engage in the ring groove 10 on the end sprocket 11, as can be seen in FIGS. 7 and 8. The end sprocket mounting ring 8 thus may follow the principle of the multi-sprocket cassette according to the invention.

The mounting projections 9 transfer the torque from the conical body 1 to the end sprocket 11 and are configured and dimensioned so that no excessively high surface pressures occur at the contact points. Since the mounting projections 9 are formed out of the end sprocket mounting ring 8, the wall thickness of the area of the end sprocket mounting ring engaging in the ring groove 10 determines the size of the contact surface with respect to each of the mounting holes 14. Therefore, the section of the end sprocket mounting ring 8 engaging in the ring groove 10 may be designed with a relatively large first wall thickness G.

The number of mounting projections 9 can be lower than the number of teeth 5 arranged on the largest sprocket portion 4 They may be arranged in circumferential direction, in positions adjacent where the end sprocket 11 has connecting arms 15 pointing radially inward in the direction of carrier profiles 21, which are used for transferring the torque.

Figure 6:
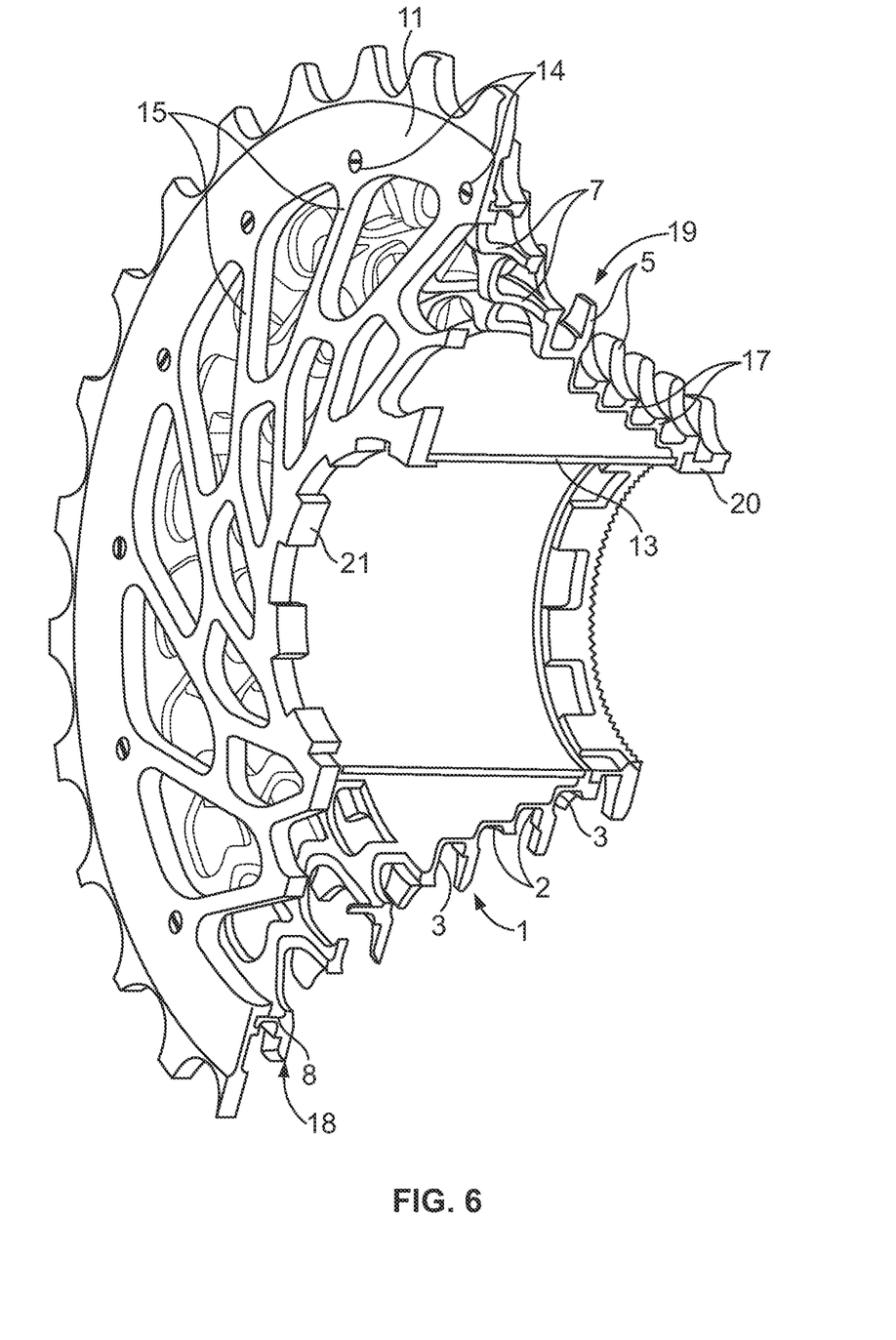
FIG. 6 is a cross-sectional view through the multi-sprocket cassette according to FIG. 5, provided with a spacer sleeve for mounting the cassette to a bicycle hub.

For installation of the multi-sprocket cassette on a hub sleeve, in addition to the conical body 1 and the end sprocket 11, a spacer sleeve 13 and a tensioning sprocket 20 may be used, as shown in FIG. 6. The tensioning sprocket 20 may be pre-stressed in the axial direction by an end screw (not shown) opposite a stop for the end sprocket 11 (not shown) and presses the entire multi-sprocket cassette on the stop in order to fix it in the axial direction. After a slight deformation of the conical body 1 in the axial direction, it comes to rest and there is force transmission at the spacer sleeve 13 that is arranged between end sprocket 11 and the smallest of the sprocket portions 4. Because of this, the conical body is not exposed to high axial forces.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A multi-sprocket cassette mountable to a bicycle rear wheel hub for engaging a drive chain, comprising:
   a conical body formed as a single piece having a center axis and including:
      a plurality of sprocket portions, each of the plurality of sprocket portions including a plurality of teeth formed thereabout for engaging the drive chain; and
      a plurality of first and second connecting portions supporting the plurality of sprocket portions, wherein each of the plurality of first and second connecting portions include a cylindrical portion and a disk portion, wherein each of the plurality of first and second connecting portions is disposed between an adjacent pair of the plurality of sprocket portions, the first connecting portions including a first wall thickness and the second connecting portions having only a second wall thickness, the second wall thickness being less than the first wall thickness; and
   at least one opening formed through the first connecting portions having the first wall thickness.

2. The multi-sprocket cassette according to claim 1, wherein the first wall thickness is about twice as thick as the second wall thickness.

3. The multi-sprocket cassette according to claim 1, wherein the first wall thickness is from about 0.8 mm to about 1.2 mm.

4. The multi-sprocket cassette according to claim 3, wherein the second wall thickness is from about 0.4 mm to about 0.6 mm.

5. The multi-sprocket cassette according to claim 1, wherein the plurality of sprocket portions include a larger diameter sprocket portion and an adjacent smaller diameter sprocket portion, the larger diameter sprocket portion having at least two teeth more than the adjacent smaller diameter sprocket portion, wherein one of the plurality of first connecting portions extends between the larger diameter sprocket portion and the adjacent smaller sprocket portion formed of the first wall thickness.

6. The multi-sprocket cassette according to claim 5, wherein each of the plurality of first and second connecting portions form a step-shaped cross section through the conical body center axis.

7. The multi-sprocket cassette according to claim 1, including a plurality of openings formed through each of the first connecting portions.

8. The multi-sprocket cassette according to claim 1, wherein each of the plurality of first and second connecting portions includes a cylindrical portion and a disk portion, the at least one opening formed through one of the cylindrical portion and the disk portion of some or all of the plurality of first connecting portions.

9. The multi-sprocket cassette according to claim 1, wherein each of the plurality of first and second connecting portions includes a cylindrical portion and a disk portion, the at least one opening formed through both the cylindrical portion and the disk portion of some or all of the plurality of first connecting portions.

10. The multi-sprocket cassette according to claim 1, wherein only the first connecting portions include the at least one opening.

11. A multi-sprocket cassette mountable to a bicycle rear wheel hub for engaging a drive chain, comprising:
    a conical body formed as a single piece having a center axis and an inboard end and including:
       a plurality of sprocket portions, each of the plurality of sprocket portions including a plurality of teeth formed thereabout for engaging the drive chain;
       a plurality of first and second connecting portions supporting the plurality of sprocket portions, the first connecting portions including a first wall thickness and the second connecting portions having only a second wall thickness, the second wall thickness being less than the first wall thickness; and
       a mounting ring portion formed on the inboard end of the conical body including the second wall thickness and projecting axially therefrom; and
    an end sprocket attached to the mounting ring portion.

12. The multi-sprocket cassette according to claim 11, wherein the first wall thickness is from about 0.8 mm to about 1.2 mm.

13. The multi-sprocket cassette according to claim 12, wherein the second wall thickness from about 0.4 mm to about 0.6 mm.

14. The multi-sprocket cassette according to claim 11, wherein the mounting ring portion is formed without openings.

15. The multi-sprocket cassette according to claim 11, wherein the end sprocket extends radially inwardly to support itself on the hub of the rear wheel.

16. The multi-sprocket cassette according to claim 11, wherein the mounting ring portion includes a plurality of mounting projections.

17. The multi-sprocket cassette according to claim 16, wherein the end sprocket includes a plurality of connecting arms and a plurality of mounting holes, each of the plurality of mounting holes being formed adjacent a respective one of the plurality of connecting arms and wherein the mounting projections are configured to be received in the mounting holes.

18. The multi-sprocket cassette according to claim 11, wherein the end sprocket includes a ring groove configured to receive the mounting ring portion.

19. The multi-sprocket cassette according to claim 11, further comprising a plurality of openings formed through each of the plurality of first connecting portions.

* * * * *